United States Patent [19]

Wasserman et al.

[11] 4,185,136

[45] Jan. 22, 1980

[54] COATED ELECTRODES

[75] Inventors: René Wasserman, Echichens; Wolfgang Simm, Lausanne, both of Switzerland

[73] Assignee: Eutectic Corporation, Flushing, N.Y.

[21] Appl. No.: 821,502

[22] Filed: Aug. 3, 1977

[30] Foreign Application Priority Data

Aug. 3, 1976 [CH] Switzerland .................. 9870/76

[51] Int. Cl.$^2$ ............................... B32B 15/02
[52] U.S. Cl. .................... 428/561; 219/145.23; 427/59; 427/61; 428/379; 428/385; 428/386; 428/387; 428/389; 428/372; 428/368; 428/562; 428/563
[58] Field of Search ............ 428/379, 389, 372, 385, 428/386, 387, 368; 427/59, 61; 219/145, 146

[56] References Cited

U.S. PATENT DOCUMENTS

| | | | |
|---|---|---|---|
| 944,139 | 12/1909 | Jones | 428/379 |
| 951,990 | 3/1910 | Harrison | 428/379 |
| 2,077,397 | 4/1937 | Christensen | 428/379 |
| 2,697,159 | 12/1954 | Donahey | 427/61 |
| 3,118,760 | 1/1964 | Avery et al. | 427/61 |
| 3,247,297 | 4/1966 | Salesse et al. | 428/402 |
| 4,010,309 | 3/1977 | Petersen | 427/61 |

*Primary Examiner*—George F. Lesmes
*Assistant Examiner*—E. Rollins Buffalow
*Attorney, Agent, or Firm*—Hopgood, Calimafde, Kalil, Blaustein and Lieberman

[57] ABSTRACT

A coated electrode is provided comprising a metal core rod and a sheath coating enveloping said rod, said sheath consisting essentially of at least one hard phase-forming element in particulate form bonded to said rod, said sheath containing an amount of a solid metal halogenide ranging from over 0.01 to 3% by weight of said sheath effective to provide a weld deposit in which hard phases are uniformly distributed therethrough.

10 Claims, No Drawings

COATED ELECTRODES

This invention relates to a coated electrode comprising a metal core and a sheath coating enveloping said metal core said coating containing hard phase-forming elements in particulate form distributed therethrough.

STATE OF THE ART

Coated electrodes are known for applying abrasion resistant protective coatings onto a metal substrate, e.g. ferrous metal substrates, the abrasion resistance of the coating being due to the presence of hard phases formed by the combination of carbon with such hard phase-forming elements selected from the group consisting of Fe, Cr, Mo, W, V, Nb, Ta, Zr and Ti in the form of carbides. Other hard phases provide the same function, such as silicides, nitrides and borides of the foregoing elements.

There are welding electrodes comprising a cast core rod containing preformed carbides. Electrodes have also been provided of low alloy core wire or rod with a sheath or coating enriched with carbide-forming elements which when melted down produce the desired weld deposit characteristics. The latter electrode material is more advantageous over the former in that it provides the metallurgist with a wider selection of weld deposit compositions.

However, it is difficult to combine acceptable welding characteristics with good melting practice while at the same time maintain homogeneity of the deposit, that is to say, maintain a uniform distribution of the carbides in the deposit, especially where the carbon content of the composition is relatively high, the carbides being desirable for optimum wear resistance. Moreover, such coated electrodes usually contain slag-forming constituents, such as lime and silica, among other commonly used slag-formers, which tend to affect adversely the welding process.

We have now discovered that the desired combination of welding characteristics of coated electrodes can be provided to an optimum degree by omitting the commonly used slag-forming components, contrary to prevailing opinion, by employing in place of the conventional slag-formers a small but effective amount of a solid metal halogenide, preferably metal fluorides.

OBJECTS OF THE INVENTION

It is thus the object of the invention to provide a new and improved sheath coated electrode substantially free of conventional slag-formers.

Another object is to provide an improved sheath coated electrode characterized by improved welding properties by including in the coating of the electrode a small but effective amount of metal halogenide, such as alkali metal fluorides, alkali metal double fluorides, magnesium fluoride and other metal halogenides.

These and other objects will more clearly appear when taken in conjunction with the following disclosure and the appended claims.

STATEMENT OF THE INVENTION

Stating it broadly, the invention s directed to a coated electrode comprising a metal core rod and a sheath coating enveloping said rod, said coating consisting essentially of hard phase-forming elements in particulate form bonded to said rod by means of a bonding agent and also containing an auxiliary extrusion agent, characterized in that the sheath contains an amount of a solid metal halogenide ranging from over 0.01 to 3% by weight of said sheath effective to provide a homogeneous weld deposit in which the hard phases formed in the weld deposits, e.g. carbides, are uniformly distributed therethrough.

Examples of commonly employed bonding agents are potassium silicate, sodium silicate, alkali metal aluminate (e.g. sodium aluminate), and the like. The amount of the foregoing bonding agent employed may preferably be approximately 5% by weight of the sheath and generally range from about 2% to 8% by weight of said sheath.

The sheath is usually extruded to envelop the core rod (the term "rod" used hereinafter also includes "wire") in which case auxiliary extrusion agents or lubricants are included in the sheath composition, such as polysaccharides, alginates, cellulose derivatives, bentonite, etc. The amount of extrusion agent should be effective to provide lubrication during extrusion and may range up to about 5% by weight of the sheath composition.

In a more preferred embodiment, it has been observed that the addition of the solid halogenide (especially a metal fluoride) into the sheath composition in amounts of about 0.1% to 1.5% by weight, as well as about 0.2% to 1%, has a particularly beneficial effect on the welding characteristics of the electrode material.

The sheath composition consists essentially of hard phase-forming constituents selected from the group consisting of Fe, Cr, Mo, W, V, Nb, Ta, Zr and Ti and also carbon. Optionally, at least one of the constitutents B and Si may be present.

When carbon is present, it ranges by weight from about 2% to 15% and, preferably, from about 5% to 12%, based on the total weight of the electrode. The carbide composition produced from the electrode in the formation of protective coatings exhibits resistance to wear and abrasion on cast iron as well as other ferrous metal substrates.

Among the effective fluorides which are particularly useful as additives to the sheath coating are alkali metal fluorides, alkali metal double fluorides, such as Na$_3$AlF$_6$, and magnesium fluoride. However, alkali metal double fluorides including the Group IV metals of the periodic system of elements consisting of Si, Ti and Zr are quite effective as fluoride additives, as well as double fluorides containing aluminum.

The core rod may comprise an iron-base, nickel-base, cobalt-base and copper-base material. An example of an iron-base material is mild steel, such as 1010 steel.

In obtaining the desired final composition of a weld deposit (e.g. a protective coating) on a ferrous metal substrate, the materials in the core rod are proportioned to the hard phase-forming elements in the sheath such that the ratio of the total portion of Fe, Ni, Co and/or Cu in the core rod to the total hard phase-forming elements in the sheath coating ranges from about 0.2:1 to 9:1, or about 0.3:1 to 5:1, or even about 0.5:1 to 3:1, based on the total electrode.

Small amounts of silicon and/or boron may be present in the sheath, such as 0.1% to 1.5% of each. The presence of silicon in the weld deposit provides resistance to oxidation and corrosion.

The presence of boron provides improved resistance to wear by virtue of the formation of borides with the hard phase-forming elements in the sheath coating and even by reaction with the core rod metal. Boron may provide a hard phase of boron carbide or provide, for example, chromium boride.

Small quantities of deoxidation agents are usually present in most alloys contained in the sheath without adversely affecting the welding characteristics. It is advantageously desirable for the sheath to be enriched in high carbon-containing compounds. A preferred sheath composition is one in which at least about 80% of the alloying elements present in the sheath is chromium.

As stated above, the core rod may be an iron-base, nickel-base, cobalt-base and copper-base alloy. An example of an electrode is one in which a mild steel core is employed (e.g. 1010 steel) and in which the sheath coating composition is such that the weld deposit on a ferrous substrate will contain 20% Cr, 5% Nb, 5% Mo and 5% W combined as carbides and the balance iron. Another example is a sheath coated mild steel core (1010 steel) in which the composition of the sheath is such that the weld deposit produced from the electrode contains 40% Cr, 6% C and the balance iron.

The present electrodes of the invention are not dangerous to the environment and, in fact, provide minimum pollution at the work site. The improved welding properties are characterized such that homogeneous weld deposits are obtained with good build-up of the deposit, in which absence of adverse slag formation is assured and, moreover, in which the electrodes can be used at high welding speeds, all of the foregoing properties being highly advantageous from a commercial viewpoint.

A more specific embodiment of the invention resides in a coated electrode comprising a metal core rod and a sheath coating enveloping said rod, said core rod being selected from the group consisting of an iron-base, nickel-base, cobalt-base and copper-base weld metals. The sheath coating consists essentially by weight of about 0.01% to 3% of a solid metal halogenide or halide, e.g. alkali metal fluoride, or double fluoride, or $MgF_2$ (preferably 0.1% to 1.5% or 0.2% to 1%), about 2% to 8% of a bonding agent, up to about 5% by weight of an auxiliary extrusion agent and the balance essentially hard phase-forming elements in particulate form selected from the group consisting of Fe, Cr, Mo, W, V, Nb, Ia, Zr and Ti, the sheath also containing carbon in an amount ranging from about 2% to 15% of the total weight of the electrode, e.g. 5% to 12% by weight.

As stated earlier, the foregoing composition may include other elements such as silicon and boron.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A coated electrode comprising a metal core rod and a sheath coating enveloping said rod, said core rod being selected from the group consisting of an iron-base, nickel-base, cobalt-base and copper-base weld metal, the sheath coating containing substantially no silica or lime and said coating consisting essentially by weight of about 0.01 to 3% of solid metal halogenide selected from the group consisting of alkali metal fluorides, alkali metal double flourides and $MgF_2$, about 2% to 8% by weight of a bonding agent selected from the group consisting of alkali metal silicates and alkali metal aluminates, up to about 5% by weight of an auxiliary extrusion agent and the balance essentially at least one hard phase-forming element in particulate form selected from the group consisting of Fe, Cr, Mo, W, V, Nb, Ta, Zr and Ti, said sheath coating also containing carbon in an amount ranging from about 2% to 15% of the total weight of the electrode, the ratio by weight of the core rod metal to the hard phase-forming elements in the sheath ranging from about 0.2:1 to 9:1.

2. The coated electrode of claim 1, wherein the metal halogenide in the sheath ranges from about 0.1% to 1.5% by weight of the sheath.

3. The coated electrode of claim 2, wherein said metal halogenide ranges from about 0.2% to 1% by weight of said sheath.

4. The coated electrode of claim 1, wherein the double fluoride of the alkali metal double fluoride contains an element selected from the group consisting of Si, Ti, Zr and aluminum.

5. The coated electrode of claim 1, wherein the metal fluoride is $MgF_2$.

6. The coated electrode of claim 1, wherein the sheath contains 0.1% to 1.5% Si by weight of the sheath.

7. The coated electrode of claim 1, wherein the sheath contains 0.1% to 1.5% B by weight of the sheath.

8. The coated electrode of claim 1, wherein the ratio of meals in the core rod to the hard phase-forming elements in the sheath ranges from about 0.3:1 to 5:1.

9. The coated electrode of claim 1, wherein at least 80% by weight of the hard phase-forming elements in the sheath is chromium.

10. The coated electrode of claim 1, wherein the auxiliary extrusion agent is selected from the group consisting of polysaccharides, alginates, cellulose derivatives and bentonite.

* * * * *